US005723022A

United States Patent [19]

Dauplaise et al.

[11] Patent Number: 5,723,022
[45] Date of Patent: Mar. 3, 1998

[54] TEMPORARY WET STRENGTH RESINS

[75] Inventors: David Louis Dauplaise, Stamford; Gerald J. Guerro, Trumbull, both of Conn.

[73] Assignee: Cytec Technology Corp., Wilmington, Del.

[21] Appl. No.: 678,739

[22] Filed: Jul. 11, 1996

[51] Int. Cl.$^6$ .............................. D21H 17/45; C08F 8/28
[52] U.S. Cl. .............................. 162/168.3; 162/168.2; 525/154; 525/328.2; 525/329.4
[58] Field of Search .............................. 525/329.4, 328.2; 162/168.3

[56] References Cited

U.S. PATENT DOCUMENTS

| | | | |
|---|---|---|---|
| 3,556,932 | 1/1971 | Coscia et al. | 525/329.4 |
| 4,605,702 | 8/1986 | Guerro et al. | 525/328.2 |
| 5,316,623 | 5/1994 | Espy | 162/168.3 |
| 5,318,669 | 6/1994 | Dasgupta | 162/168.3 |
| 5,320,711 | 6/1994 | Dauplaise et al. | 162/168.2 |
| 5,427,652 | 6/1995 | Darlington et al. | 162/168.3 |
| 5,470,918 | 11/1995 | Tsutumi et al. | 525/329.4 |

FOREIGN PATENT DOCUMENTS 0133 699 A2  8/1984  European Pat. Off. .

*Primary Examiner*—Tae Yoon
*Attorney, Agent, or Firm*—Claire M. Schultz; Frank M. Van Riet

[57] ABSTRACT

Compositions comprising a blend of (1) an ionic, water-soluble, vinylamide polymer containing sufficient vinylamide and —CHOHCHO substituents to be thermosetting and a ratio of glyoxal substituents to glyoxal-reactive substituents in excess of about 0.02:1.0 and (2) a glyoxalated, cationic, water-soluble vinylamide polymer having a molecular weight of about 500 to about 6000, sufficient glyoxal-reactive and glyoxal substituents to be thermosetting and a ratio of glyoxal substituents to vinylamide substituents being in an excess of about 0.1:1.0, are disclosed.

14 Claims, No Drawings

TEMPORARY WET STRENGTH RESINS

BACKGROUND OF THE INVENTION

The incorporation of wet strength agents into cellulosic fibers during the papermaking process involving wet-laid webs is well known. The addition of these agents provides paper products with a permanent wet strength which enables the products to withstand moisture without deterioration of the paper. Many products, however, do not require permanent wet strength and, in fact, in these products containing permanent wet strength can be a detriment. For example, bath tissue, facial tissue, paper toweling, etc., products which require wet strength for only a short period of time, e.g. 5 minutes, are difficult to dispose of into sewers, septic systems, etc., if their wet strength is not lost within a few minutes after disposal because of their tendency to clog such systems if they do not deteriorate.

Accordingly, it has become more and more common to add temporary wet strength agents to such products so as to enable them to possess sufficient wet strength for use, but to lose that wet strength upon soaking in water.

Additionally, due to the increased demand for paper and the emergence of paper recycling, there is a need to produce paper which is more readily repulpable. For example, paperboard products which are recycled must be defibered and repulped in neutral water without superfluous, expensive or extraordinary processing requirements and permanent wet strength resins again are a detriment to such processing. Thus, as above discussed, the need for wet strength agents for paper products such as paperboard which impart sufficient wet strength to the product so as to enable it to undergo its intended use but still allow the recycling and easy repulping thereof is well established in the marketplace.

Examples of prior art attempts to develop temporary wet strength agents can be found in the following U.S. patents.

U.S. Pat. No. 4,603,176 describes a tetrapolymer resin product containing a polar, non-nucleophilic unit which does not cause the polymer to become insoluble, a hydrophilic, cationic unit to impart a positive charge to the polymer, an amide unit and a glyoxal capped unit.

U.S. Pat. No. 4,605,702 describes a glyoxalated, cationic water-soluble acrylamide polymer containing 1–30%, by weight, of a copolymerized cationic monomer, having a molecular weight of about 500–6000 and a ratio of glyoxal to acrylamide units ranging from about 0.1–0.5:1.0.

U.S. Pat. No. 4,981,557 claims paper products containing water-soluble, temporary wet strength agents having a complete absence of nucleophilic functionalities and containing a —CO—X—R—COH group wherein X is —O—, —NH— or —NCH$_3$— and R is an aliphatic group. The polymers also contain non-nucleophilic, water-soluble, nitrogen heterocyclic moieties.

U.S. Pat. No. 5,008,344 is related to the above '557 patent and claims the polymers per se including those where X is a —COH— group.

U.S. Pat. No. 5,085,736 is a division of the above '344 patent.

U.S. Pat. No. 5,138,002 is a division of the above '557 patent.

U.S. Pat. No. 5,427,652 teaches the use of a combination of a permanent wet strength agent and a temporary wet strength agent to produce a repulpable paperboard. The permanent wet strength agent is a polyamine epichlorohydrin, a polyamide epichlorohydrin or a polyamine-amide epichlorohydrin resin and the temporary wet strength agent a glyoxalated vinylamide wet strength resin.

SUMMARY OF THE INVENTION

It has now been found that excellent paper products can be produced having sufficient wet strength to be useful for their intended use even though subjected to a water environment and still be readily disposed of via sewer or septic units and repulpable under ordinary repulping conditions when blends of glyoxalated vinylamide polymers with different properties are employed as the wet strength agent added thereto during manufacture. These blends give sufficient wet tensile development and associated dry tensile and retain their temporary nature in that the decay levels remain high enough to permit easy repulping or disposal in septic and/or sanitary sewer systems.

DESCRIPTION OF THE INVENTION INCLUDING PREFERRED EMBODIMENTS

The instant invention relates to a composition comprising a blend of:

A) from about 5% to about 50%, by weight, of an ionic, water-soluble vinylamide polymer having a weight average molecular weight of from about 100,000 to about 3 million preferably about 200,000 to about 2 million, and sufficient glyoxal-reactive amide substituents and —CHOHCHO substituents to be thermosetting, the ratio of the number of said —CHOHCHO substituents to the number of said glyoxal-reactive substituents being in excess of about 0.02:1.0, respectively, and B) from about 50% to about 95%, by weight, of a glyoxalated, cationic, water-soluble vinylamide polymer containing from about 70–99%, by weight, of a vinylamide and from about 1–30%, by weight, of a cationic monomer or mixture of cationic monomers copolymerizable with said vinylamide and having a molecular weight ranging from about 500 to about 6000 before glyoxalation and sufficient glyoxal-reactive amide substituents and —CHOHCHO substituents to be thermosetting, the ratio of glyoxal substituents to vinylamide substituents being in an excess of about 0.1:1.0, respectively.

These two glyoxalated polymer components are known in the art. Component A is as disclosed in U.S. Pat. No. 3,556,932 whereas Component B is as disclosed in above-identified U.S. Pat. No. 4,605,702.

Component A is a known wet strength agent which found substantial use in the 1970's and, although the wet strength imparted thereby is somewhat temporary in nature in that about one-half of its wet strength is lost upon soaking paper containing it in water over about 30 minutes. This "temporary" behavior, however, is generally insufficient to allow its use in applications where wet strength must be much more temporary than exhibited by these polymers.

Component B is a known temporary wet strength agent which was developed to have immediate wet strength but to begin to lose that property relatively rapidly when disposed of in a water environment. The polymer has a much overall lower initial wet tensile development but a higher degree of decay of wet strength than that of Component A. The overall lower initial wet and dry strength of this polymer, however, does not meet the industry specifications for many current and development grade paper products.

Thus, while Component A imparts high initial wet and dry strength to paper products, it does not lose this strength rapidly enough in water to be useful in paper products which are repulped or discarded into a water environment and while paper containing Component B loses its wet and dry strength rapidly on contact with water, it does not possess an initial wet and dry strength to be commercially feasible in many applications.

It would be expected, however, that if a blend of Component A and Component B were applied to paper, the paper may possess an initial wet and dry strength higher than that containing Component B alone but that the decay of the wet strength would be similar to that of Component A.

Unexpectedly, it was found that the addition of modest amounts of Component A to Component B did not adversely affect the decay of the initial wet strength of the resultant paper to which the combination was added and, in fact, also raised the initial wet and dry strength over that obtained using Component B alone. Thus, the two polymers act together in a manner which overcomes the detrimental aspects of each polymer individually while concurrently achieving a greater result than that obtained using the worst polymer alone.

Components A of the present invention are ionic water-soluble polyvinylamides having sufficient —CHOHCHO substituents to be thermosetting.

The amount of ionic component in the polymers is that which is sufficient to render them self-substantive to cellulose fibers in aqueous suspensions (in the case of the cationic polymers of the present invention), or to render them precipitatable on cellulose fibers in aqueous suspensions by the action of alum (in the case of anionic polymers of the present invention), the proportion of ionic or ionic groupings which need be present in the polymers of the present invention). The proportion of ionic or ionic groupings which need be present in the polymers, is small, generally less than 10 mol percent of the vinyl components of the polymer. If desired, however, a larger proportion may be present.

Sufficient ionic groupings are present when upwards of 50% of the amount of polymer in any one instance is retained by the fibers (as determined by analysis of the fibers for their nitrogen content before and after treatment).

It is preferable for the polymers to contain between 1 and 10 ionic groupings per 100 chain carbon atoms (e.g., 4 to 10 ionic substituents per macromolecule of 200 monomer units).

The vinylamide content of the polymers of the present invention provides the sites to which the glyoxal substituents (hereinafter designated "—CHOHCHO substituents") are attached. The minimum proportion of vinylamide units which should be present in any instance can be determined by laboratory trial: the proportion of these substituents should be sufficient so that the polymer (with —CHOHCHO substituents attached) is thermosetting, i.e., so that a film of the polymer laid down from water solution on a glass plate and heated for 5 minutes at 105° C. is insoluble in water at room temperature.

The vinylamide units provide sites to which the —CHOHCHO substituents are attached and with which these substituents react during the thermosetting reaction.

About 10 mol percent of vinylamide units (based on the total number of vinyl monomer units present) appear to be the minimum needed to provide the necessary number of sites. It is usually advantageous for the proportion of these units to be higher, larger proportions promoting the wet-strengthening properties of the polymer without conferring any significant off-setting disadvantage and avoiding the loss resulting from the presence of too low a proportion of these groups. It thus is better for the vinylamide units to be present in major amount, i.e., in amount larger than 50 mol percent, and better still for the proportion of these units to be in excess of 75 mol percent. The remaining units in the polymers of the present invention are the units which confer ionic properties of the polymer, or those which act as diluents or spacers, or which confer special properties, for example, improved or diminished water-solubility.

Products of glyoxal with polymers composed of acrylamide and diallyldimethyl ammonium chloride resides in molar ratio between 99:1 and 75:25; with polymers composed of methacrylamide and 2-methyl-5-vinylpyridine in 99:1 to 50:50 molar ratio; and cationic water-soluble monomers composed of vinyl acetate, acrylamide and diallyldimethyl ammonium chloride in about 8:40:2 molar ratio, may be used.

The polymers are prepared from vinylamides which may have any weight average molecular weight up to the point where they do not dissolve in water but instead merely form non-fluid gels. Such polymers are adequately water-soluble at molecular weights in the range of 100,000–2,000,000, via light scattering. Solutions thereof in water are not overly viscous, and these polymers may usefully possess still higher molecular weights. However, lower molecular weight polymers are more easily handled (because of their lower viscosity and easier water-dilutability) and when reacted with glyoxal they possess increased storage stability. It is preferred to employ polymers having molecular weights ranging from about 5,000 to about 25,000 as starting materials. Such polymers contain roughly 200–300 monomer units per average macromolecule, of which about 150–200 units are vinylamide units.

The polymers are water-soluble and aqueous solutions thereof are clear, colorless, and sparkling and free from haze. The latter indicates that the polymeric molecules are substantially entirely hydrophilic and are of sub-colloidal dimensions. On standing at room or elevated temperature at 2%–5% solids, these solutions develop a blue opalescent haze, which shows that the macromolecules have attained colloidal dimensions, evidently as the result of intermolecular condensations.

In certain instances, aqueous solutions of the polymers are hazy when freshly prepared. The cause of this haze has not been ascertained, but is generally caused by the presence of macromolecules which are not substantially entirely hydrophilic but which are on the borderline between being hydrophilic and hydrophobic (insoluble). Such molecules contain hydrophobic linkages, for example, the residues of styrene, acrylonitrile, octadecyl acrylate, N-octyl acrylamide, etc., in sufficient number to place them on the borderline between water-solubility and water-insolubility. The haze may be composed of colloidal particles or of colloidal aggregates of sub-colloidal particles.

Best wet strength is imparted by colloidal particles. In numerous instances, the wet strengthening property of a polymer increases by 10% to 15% when it has grown to colloidal dimensions. This increase in efficiency is obtained merely by permitting the polymer solutions to age until they develop a colloidal haze.

In perhaps their simplest forms the polymers are composed of acrylamide and glyoxalated acrylamide units plus units which confer an ionic charge to the molecule. If desired, diluent units may be present in small amounts.

In practice, the polymers are generally most conveniently prepared by reacting a preformed ionic hydrophilic water-soluble polyvinylamide with sufficient glyoxal to form a water-soluble polymer which is thermosetting. Many suitable polyvinylamides for the purpose are known, some of which are commercially available.

Cationic polyvinylamides suitable for reaction with glyoxal to form polymers useful in the present invention include those which are produced by copolymerizing a water-soluble vinylamide with a vinyl, water-soluble, cationic monomer which carries a positive electrostatic charge when dissolved in water, for example, 2-vinylpyridine, 2-vinyl-N-methylpyridinium chloride, diallyldimethylammonium chloride, (p-vinylphenyl)-trimethylammonium chloride, 2-(dimethylamino)ethyl acrylate, etc.

Alternatively, cationic polymers may be produced from non-ionic polyvinylamides, by converting part of the amide substituents thereof (which are non-ionic) to cationic substituents. One such polymer can be produced by treating polyacrylamide with an alkali metal hypohalite; part of the amide substituents are degraded by the Hofmann reaction to cationic amine substituents, see U.S. Pat. No. 2,729,560. Another example is the 90:10 molar ratio acrylamide; p-chloromethylstyrene copolymer which is converted to cationic state by quaternization of the chloromethyl substituents with trimethylamine. The trimethylamine can be replaced in part or in whole with triethanolamine or other water-soluble tertiary amine.

Alternatively still, cationic polymers can be prepared by polymerizing a water-soluble vinyl tertiary amine (for example, dimethylaminoethyl acrylate or vinylpyridine) with a water-soluble vinyl monomer copolymerizable therewith (for example, acrylamide) thereby forming a water-soluble cationic polymer. The tertiary amine groups can then be converted into quaternary ammonium groups by reaction with methyl chloride, dimethyl sulfate, benzyl chloride, etc., in known manner, with enhancement of the cationic properties of the polymer. Moreover, polyacrylamide can be rendered cationic by reaction with a small amount of glycidyl dimethylammonium chloride.

Anionic polymers useful in the present invention can be prepared as follows. A water-soluble, aldehyde reactive vinylamide (for example acrylamide and crotonamide) may be copolymerized with a water-soluble vinyl acidic material, for example, acrylic acid, methaorylic acid, maleic acid and vinylbenzenesulfonic acid, and the copolymer is reacted with glyoxal. The resulting polymer is anionic and thermosetting.

Also, the anionic substituents may be formed in situ in the polymer. Thus, polyacrylamide may be subjected to partial hydrolysis, resulting in formation of a vinyl polymer which comprises —COOH linkages, or an alkali metal salt thereof. Moreover, ethyl acrylate may be copolymerized with a suitable aidehyde-reactive compound (for example acrylamide), and the resulting polymer may be subjected to hydrolysis and reacted with glyoxal to form a thermosetting polymer.

According to a third method, a non-ionic hydrophilic thermosetting polyacrylamide-glyoxal polymer may be reacted with sodium or potassium bisulfite, which introduces —SO$_3^-$K$^+$ or —SO$_3^-$Na$^+$ substituents into the polymer thereby rendering it anionic.

The reaction of the polymer with glyoxal is conveniently performed by warming a dilute neutral or slightly alkaline aqueous solution of glyoxal and an ionic vinylamide polymer until a slight increase in viscosity is observed. The solution then contains a polymer ready for use. If desired, the solution can be cooled to room temperature and acidified; the resulting solution possesses good stability.

The glyoxal reaction described above does not go to completion. For example, when a dilute aqueous solution of 25 mols of glyoxal and a 95:5 molar ratio acrylamide:diallyldimethylammonium chloride copolymer is warmed until a slight increase in viscosity occurs, about half of the glyoxal (as determined by dialysis) does not react at all but remains dissolved in the water. Of the remaining glyoxal, the largest part reacts to the extent of only one of its functionalities (so as to introduce —CHOHCHO substituents into the polymer). The remainder of the glyoxal (a very small amount) reacts to the extent of both its functionalities (so as to unite two polymeric molecules) causing the slight increase in viscosity referred to above.

The minimum amount of glyoxal in the starting solution is such that Component A is thermosetting according to the test set forth above. A larger amount of glyoxal may be employed, but the increase in wet strength produced by such larger amount is minor.

In most instances, the amount of glyoxal taken, and the duration of the time allowed the polyvinylamide to react with the glyoxal, should be such that the molar ratio of —CHOHCHO substituents to the glyoxal-reactive amide substituents in the polymer is in excess of at least 0.02:1.0, preferably at least 0.06:1.0. This is about the minimum proportion of active glyoxal substituents needed. The ratio may be higher, and a ratio in the range of 0.10–0.20:1.0 appears to afford best wet strength efficiency.

Components B comprise cationic, water-soluble, acrylamide copolymers containing (a) from about 70–99%, by weight, based on the total weight of the copolymer, of an acrylamide and (b) from about 1–30%, by weight, same basis, of a cationic monomer or mixture of cationic monomers copolymerizable with said acrylamide. Up to about 10%, by weight, same basis, of said acrylamide may be replaced by (c) a different comonomer copolymerizable with said acrylamide, the amount of said (c) being less than said (b) if said (c) is anionic. The acrylamide copolymer has a weight average molecular weight ranging from about 500 to about 6,000 (preferably about 1,000 to about 4,000) before glyoxalation and sufficient glyoxal-reactive amide substituents and —CHOHCHO substituents to be thermosetting, the ratio of glyoxal units to acrylamide units being in excess of about 0.1:1.0, preferably ranging from about 0.1–1.2:1.0, preferably about 0.2–0.9:1.0, respectively.

Components B may contain, as the major component thereof, any acrylamide such as acrylamide per se, methacrylamide or the like. The amount of the acrylamide in the polymer preferably ranging from about 75 to about 95%, by weight.

The cationic comonomer which may be employed comprises any known cationic monomer which is copolymerizable with an acrylamide. Useful comonomers include 2-vinylpyridine, 2-vinyl-N-methyl pyridinium chloride, diallyldimethylammonium chloride, (p-vinylphenyl)-trimethylammonium chloride, 2-(dimethylamino) ethyl acrylate, methacrylamidotrimethylammonium chloride and the like. It is preferred to employ copolymers containing from about 5 to about 25%, by weight, of the cationic comonomer. Mixtures of these comonomers in concentrations within the above limits may also be used.

Up to about 10% by weight, of the acrylamide comonomer of the polymers may be replaced by other comonomers copolymerizable with the acrylamide. Such comonomers include acrylic acid, acrylic esters such as ethyl acrylate, methylmethacrylate, etc., acrylonitrile, styrene vinylbenzene sulfonic acid and the like. Since the final copolymer must be cationic, the only criteria with respect to these comonomers is that they cannot be present in the polymer in amounts greater than cationic comonomer if they are anionic in character.

The acrylamide monomer content of polymers provides the sites to which the glyoxal substituents are attached after glyoxalation. The amount of these substituents and the —CHOHCHO substituents resulting from the glyoxalation must be sufficient so as to render the resultant copolymer thermosetting, as is described above.

The reaction of the glyoxal with the low molecular weight polymer backbone may be performed as is disclosed. It is required that from about 10 to about 50 mole percent of glyoxal be reacted with the copolymer backbone per 100 mole percent of acrylamide units available. That is to say, the ratio of glyoxal to acrylamide units in the glyoxalated copolymer should be as set forth above.

The copolymer backbones with which the glyoxal is reacted are best prepared by the aqueous redox polymerization of the comonomers in the presence of a mercaptan chain stopper such as 2-mercaptoethanol; hydroxyethyl-3-mercaptopropionate and the like.

The compositions of the present invention are applied to paper in any suitable manner as is known in the art such as by spraying of an aqueous solution thereof onto the paper per se or, preferably, by incorporation of the composition in the furnish at the wet end of the papermaking process. The composition may be applied in amounts sufficient to impart wet strength to the paper, i.e., a wet strengtheningly effective amount. It has been found that amounts as little as 4 pounds per ton may be effective in imparting the desired wet strength to the paper, with amounts ranging from about 4–15 pounds per ton, preferably from about 6–12 pounds per ton, being useful.

The compositions of the present invention should comprise from about 5% to about 50%, by weight, based on the total weight of the composition, of Component A and, correspondingly, from about 50% to about 95%, by weight, same basis, of Component B. Preferably, from about 15% to about 35%, by weight, of Component A and 65% to 85%, by weight, of Component B is employed, most preferably from about 15% to about 25%, by weight, of Component A and about 75% to 85%, by weight, of Component B, same basis.

The compositions may be added in the above-specified amounts, to tissue, towel and other absorbent paper grades as well as any other grades paper or board grades which may benefit from the temporary nature of the composition, including saturating grades, and wet strength carrier board grades.

The following examples are set forth for purposes of illustration only and are not to be construed as limitations on the present invention except as set forth in the appended claims. All parts and percentages are by weight unless otherwise specified.

EXAMPLE A

Copolymer Backbone A

Into a suitable reaction vessel equipped with reflux condenser, dropping funnel, stirrer and thermometer are placed 75.5 parts of water, 34.0 parts of isopropyl alcohol, and a solution of 4.0 parts of diallyldimethyl ammonium chloride in 4.3 parts of water. To these materials at reflux are slowly added 80.8 parts (1.15 mole) of acrylamide dissolved in 83.4 parts of water and 0.4 part of ammonium persulfate dissolved in 16.2 parts of water. The acrylamide/diallyldimethyl ammonium molar ratio is 97.8:2.2. Addition is complete in 100 minutes. The reaction mixture is refluxed for an additional two hours and is then cooled. The product is substantially linear, non-thermosetting, cationic polyacrylamide having a molecular weight in the range of 7,000–20,000.

EXAMPLE B

Glyoxalation of Copolymer A

The backbone solution of Example A is adjusted to pH 7.5 by addition of dilute sodium hydroxide or sulfuric acid, as required. There is then added sodium phosphate as buffer, followed by 4.20 parts of a 40% by weight solution of glyoxal in water. The solution is adjusted to 11% polymer solids by addition of water. The pH of the solution is adjusted to 8 and the pH is lowered to 7 as soon as an increase of 1 poise occurs in the viscosity of the solution. The pH of the solution is then gradually lowered to keep the reaction progressing at a steady, moderate rate. When the polymer solution reaches a Gardner-Holt viscosity of B-C as an 11% by weight solution at 30° C., the reaction is stopped by diluting the solution to 8% polymer solids, adjusting the pH of the solution to 3.5, and cooling the solution to room temperature. The ratio of glyoxal substituents to glyoxal-reactive substituents being 0.25:1.0 (Polymer B).

EXAMPLE C

Copolymer Backbone B

A suitable three-necked reaction vessel, equipped with a Claisen adapter, reflux condenser (the exit of which was connected to a bleach trap), mechanical stirrer, thermometer, argon sparge and inlet with serum cap is charged with 1,445 parts of 49% acrylamide, 1,818 parts of water and 295.8 parts of 59.8% diallyldimethyl ammonium chloride. The pH is adjusted to 4.0+0.2 with 10% sulfuric acid. The solution is sparged with argon while stirring for fifty minutes. To the vessel is then charge 80.01 parts of 2-mercaptoethanol. Sparging is continued for ten minutes and is then interrupted. At once is added 17.78 parts of ammonium persulfate catalyst in 115.07 parts of water. An exotherm ensues, the maximum temperature of which 71° C. is achieved within three minutes. A heating bath is used to maintain the vessel at 71° C. for the remainder of the reaction. Forty-five minutes after initial catalyst charge, a booster catalyst, consisting of 7.08 parts each of ammonium persulfate and sodium metabisulfite, is added to the solution. Two separate streams are used. Booster addition catalyst time is 65 minutes. After 3.5 hours, the heating bath is removed and the solution allowed to cool. The resultant copolymer has a molecular weight of 1900.

EXAMPLE D

Glyoxalation of Copolymer B

At ambient temperatures, 970 parts of the backbone of Example C are treated with 171.5 parts of 40% glyoxal, in a suitable three-necked vessel equipped with a mechanical stirrer and is diluted to 20% polymer solids by addition of water. While stirring, the pH is adjusted to 8.0 and maintained at this level with 10% sodium hydroxide. The viscosity is monitored using a Gardner Bubble Viscometer until a level of B+ is achieved. The reaction is then quenched by the addition of 10% $H_2SO_4$, until a pH of 3.2+0.2 is reached. Total time for the reaction is 5.7 hours. The ratio of glyoxal substituents to vinylamide substituents is over 0.6:1.0 (Polymer D).

EXAMPLE 1

The glyoxalated Polymers B and D are blended to effect a solids ratio (w/w %) of 80/20, respectively. The requisite amount of water is then added to reduce the total solids to 10% concentration.

To an aqueous pulp at 0.6% consistency, and pH 5.5 composed of 1:1, hardwood:softwood fibers beaten to C.S.F. of 480 ml is added sufficient of the glyoxalated copolymers mixture to provide a dosage level of ten pounds of resin per ton of furnish. The pulp pH is adjusted to 5.5 and the mixture is then stirred briefly to permit absorption of the resin onto the fiber. From this mixture is then produced several eight inch by eight inch fifty-pound basis weight handsheets using a stationary deckle papermaking machine. The web is pressed between blotters and dried on a rotary drum drier at a temperature of 240° F.

EXAMPLE 2

The glyoxalated Polymers B and D are blended to effect a solids ratio (w/w %) of 5/95, respectively. The requisite amount of water is then added to reduce the total solids to 10% solids.

Paper is then formed using the resultant mixed glyoxalated copolymers solution as in Example 1.

EXAMPLE 3

The glyoxalated Polymers B and D are blended to effect a solids ratio (w/w %) of 50/50, respectively. The requisite amount of water is then added to reduce the total solids to 10% solids.

Paper is then formed using the resultant mixed glyoxalated copolymers solution as in Example 1.

EXAMPLE 4

The glyoxalated Polymers B and D are blended to effect a solids ratio (w/w %) of 95/5, respectively. The requisite amount of water is then added to reduce the total solids to 10% solids.

The resultant mixed glyoxalated copolymers solution is then used to prepare paper sheets as in Example 1.

EXAMPLE 5

The glyoxalated Polymers B and D are blended to effect a solids ratio (w/w %) of 24/76, respectively. The requisite amount of water is then added to reduce the total solids to 10% solids.

The glyoxalated copolymers solution is then used to make paper sheets as in Example 1.

EXAMPLE 6

The glyoxalated Polymers B and D are blended to effect a solids ratio (w/w %) of 16/84, respectively. The requisite amount of water is then added to reduce the total solids to 10% solids.

Again, as in Example 1, paper sheets are prepared using the resultant mixed glyoxalated copolymers solution.

EXAMPLE 7

The Polymers B and D are blended to effect a solids ratio (w/w %) of 30/70, respectively. The requisite amount of water is then added to reduce the total solids to 10% solids.

Paper is then produced, as in Example 1, from the resultant mixed glyoxalated copolymers solution.

EXAMPLE 8

The glyoxalated Polymers B and D are blended to effect a solids ratio (w/w %) of 20/80, respectively. The requisite amount of water is then added to reduce the total solids to 10% concentration.

Paper sheets are then formed, as in Example 1, from the resultant mixed glyoxalated copolymers solution.

EXAMPLE 9

The glyoxalated Polymers B and D are blended to effect a solids ratio (w/w %) of 22/78, respectively. The requisite amount of water is added to reduce the blend to 10% solids. Paper is then produced, as in Example 1, from the resultant mixed glyoxalated copolymers solution.

EXAMPLE 10

The glyoxalated Polymers B and D are blended to effect a solids ratio (w/w %) of 18/82, respectively. Dilution with water to 10% solids is then effected.

Paper sheets are then formed, as in Example 1, from the resultant glyoxalated copolymers solution.

The paper sheets prepared in Examples 1–10 are then tested for dry and wet strength properties, percentage decay and storage stability. The results are set forth in Tables I–IV below. TAPPI Test Methods #T 456, UM 453 are used to determine the Tensile Strengths. The Percentage Decay is determined by soaking the treated paper in synthetic water for thirty minutes. All Wet Strength Tensile and Dry Strength values (immediate and thirty-minute soak) are reported in lbs./inch.

TABLE I

Handsheet Testing Results

| Polymer of Example | Immediate Wet Strength | 30 Minute Soak Wet Tensile* | % Decay |
|---|---|---|---|
| B | 2.58 | 1.41 | 47 |
| D | 1.71 | 0.48 | 72 |
| 1 | 2.32 | 0.70 | 70 |

*See U.S. Pat. No. 4,603,176.

TABLE II

Storage Stability

| | Approximate Days to Gel | |
|---|---|---|
| Polymer of Example | 77 Degrees F. | 95 Degrees F. |
| B | 10 | 3–4 |
| D | 1 Year | >150 |
| 2 | >>60 | >60 |
| 3 | >>60 | 40 |
| 4 | 40 | 8 |
| 1 | >150 | >62 |
| 1* | 83 | 21 |

*15% Solids

TABLE III

Effect of Blend Ratio

| Polymer of Example | Immediate Wet Strength | 30 Minute Soak Wet Tensile | % Decay |
|---|---|---|---|
| 5 | 2.39 | .86 | 64 |
| 8 | 2.37 | .78 | 67 |
| 6 | 2.44 | .81 | 67 |
| 2 | 2.62 | 1.02 | 61 |
| 9 | 2.39 | .86 | 64 |
| 10 | 2.46 | .84 | 66 |
| 7 | 2.69 | 1.21 | 55 |

TABLE III-continued

Effect of Blend Ratio

| Polymer of Example | Immediate Wet Strength | 30 Minute Soak Wet Tensile | % Decay |
|---|---|---|---|
| 3 | 3.36 | 1.61 | 52 |
| 4 | 3.07 | 1.43 | 53 |
| Polymer D | 1.69 | .51 | 70 |

TABLE IV

Dry Strength Comparison

| Polymer of Example | Dry Strength |
|---|---|
| B | 17.3 |
| 8 | 19.1 |
| None | 15.2 |

EXAMPLE 11

The procedures of Examples A and B are repeated, except that 20.2 g. of the acrylamide is replaced by 15.1 g. of acrylonitrile and the amount of the glyoxal solution which is added is increased to 48.3 g. The acrylamide:acrylonitrile-:diallyldimethyl ammonium chloride molar ratio is 75:25:2, and the ratio of the —CHOHCHO substitutents to the amide substituents of the copolymer is approximately 0.17:1.

It is designated as Polymer E.

EXAMPLE 12

Examples A and B are again followed wherein 75 g. of water and 35 g. of isopropyl alcohol are added to the reaction vessel and the mixture is heated to reflux. To this solution there are added separately but concurrently over 1.5 hours 4.0 g. of 2-methyl-5-vinyl pyridine and 85 g. of methacrylamide dissolved in 105 g. of water containing 0.5 g. of ammonium persulfate.

The product is diluted to 11% solids by weight, and adjusted to pH 7.5 with addition of buffer. There is then added 36.4 g. of 40% aqueous glyoxal solution, and the glyoxal is partially reacted with the polymer. A thermosetting cationic water-soluble polymer is obtained, which is stabilized by acidification, cooling and dilution to 8% solids. The ratio of —CHOHCHO substituents to the amide substituents is in excess of 0.06:1 (Polymer F).

EXAMPLE 13

Into a flask provided with agitation, reflux condenser and electric heating mantle is placed 20.6 g. (0.1 mol) of diallylmelamine dissolved in dioxane, and to this is slowly added separately and concurrently a solution of 71 g. (1 mol) of acrylamide in dioxane and 0.5 g. Of benzoyl peroxide dissolved in dioxane. The mixture is heated to 88° C. and cooling is applied to maintain the exotherm at 90° C. When the exotherm subsides, the flask is maintained at 100° C. for 90 minutes. The resultant copolymer is filtered off and is washed with dioxane.

The copolymer is dissolved in water and the solution adjusted to 11% solids by addition of water. The solution is adjusted to pH 7.5. Sodium phosphate buffer and 43 g. of 40% aqueous glyoxal solution are added. The mixture is further processed by the method of Example B. A polymer having similar properties is obtained (Polymer G).

EXAMPLE 14

The procedures of Examples A and B are followed, except that the monomers employed are 92 g. of acrylamide and 8 g. of acrylic acid. The two monomers are premixed with the water, and this solution and the catalyst solution are added concurrently to the refluxing aqueous isopropanol. The copolymer is reacted with glyoxal as shown in Example B. A water-soluble thermosetting anionic polymer is obtained. The ratio of the —CHOHCHO substituents to the amide substituents present in the product is about 0.12:1 (Polymer H).

EXAMPLE 15

Into a closed reactor containing a stirrer, thermometer, nitrogen gas inlet tube and dropping funnel are introduced 20 g. of a 50% by weight aqueous solution of sodium vinylsulfonate, 1 g. of potassium persulfate, and 0.5 g. of $Na_2S_2O_5$, all air being swept from the reactor by a stream of nitrogen gas. The mixture is heated to 40° C. without stirring. There are then added dropwise over two hours a solution of 40 g. of sodium vinylsulfonate solution in 40g. of water at pH 4.5 and a solution of 40 g. of acrylamide plus 10 g. of acrylonitrile in 100 g. of water. There is then added dropwise over ½ hour 50 g. of water containing 0.5 g. of potassium persulfate and 0.25 g. of $Na_2S_2O_5$. Stirring is continued for 7 hours at 80° C. The polymer is precipitated by addition of methanol and the precipitate is washed with methanol and dried.

71 g. of the resultant polymer are dissolved in 630 g. of water. The solution is adjusted to pH 7.5 by addition of sodium hydroxide and buffer, and 36.0 g. of a 40% aqueous solution of glyoxal are added. Partial reaction between the polymer and the glyoxal is effected as shown in Example B.

A water-soluble anionic thermosetting polymer containing —CHOHCHO substituents is obtained (Polymer I).

EXAMPLE 16

32 g. (0.45 mol) of acrylamide and 7.6 g. (0.05 mol) of p-(chloromethyl) styrene are brought to reflux in 200 g. of acetone and 1.45 g. of benzoyl peroxide are added. After 3 hours of refluxing, the precipitated polymer is collected and air-dried. To 50 g. of a 10% by weight solution of the polymer in water are added 7.0 g. of 40% aqueous trimethylamine. After, the initial exotherm the solution is warmed at 40° C. until the pH falls below 7.0.

The solution is diluted to 100 mi. with water and to it are added 15.0 g. of 40% aqueous glyoxal solution. The pH is adjusted to 8.0 with sodium carbonate and the glyoxal is partially reacted with the polymer according to the method of Example B.

A water-soluble cationic thermosetting polymer containing —CHOHCHO substituents is obtained (Polymer J).

EXAMPLE 17

To a suitable four-necked, round bottom reaction vessel equipped with an agitator, a nitrogen inlet and outlet and a reflux condenser connected to a caustic scrubber are added 130 parts of acrylamide, 357 parts of deionized water and 127 parts of 25% aqueous solution of methacrylamidotrimethylammonium chloride. The pH is adjusted to 4.0+0.2 with 10% sulfuric acid. The solution is stirred at 250°–30° C. and sparged with nitrogen for one hour. The sparge tube is raised and a nitrogen blanket is maintained over the surface. Disodium ethylenediaminetetraacetic acid is added followed by 2-mercaptoethanol (14.4 parts) by syringe through a serum cap. Ammonium persulfate (3.2 parts in deionized water) is added rapidly by syringe to the agitated solution. An immediate exotherm takes place. The reaction is then kept at 80° C. by external heating for two hours. A second charge of ammonium parsulfate (1.6 parts in nitrogen spargad deionized water, 25 parts) is added to complete the reaction. The batch is maintained at 80° C. for one additional hour and is then cooled to 25° C. The resultant copolymer has a molecular weight of 4000.

To the copolymer at 25° C. is added 40% aqueous glyoxal (128 parts) and then 10% NaOH (40 parts) to bring the pH to 8.2. The reaction is kept at 25° C. while the Gardner-Holt viscosity is monitored. Increments of 10% NaOH are added to the well agitated batch to keep the pH at 8.2 until a Gardner-Holt viscosity of B' is attained. The pH is then adjusted with 10% $H_2SO_4$ to 7.5. When the Gardner-Holt viscosity reaches B the reaction is terminated by addition of $H_2SO_4$ to reduce the pH to 3.0+0.2 (Polymer K).

EXAMPLE 18

A suitable three-necked reaction vessel, equipped with a reflux condensor, thermometer, mechanical stirrer and 2 serum caps, is charged with 33.10 parts of 59.8% diallyl dimethylammonium chloride and 11.21 parts of water. The reaction solution is heated to reflux and maintained at this temperature during the course of the reaction. Over the next 1.5 hours are added the following reagents in separate streams: 161.41 parts of 49% acrylamide, 26.09 parts of water, 0.07 part of ethylenediaminetetraacetic acid, disodium salt; 2.22 parts of ammonium parsulfate in 10.30 parts of water and 7.81 parts of sodium metabisulfite in 18.17 parts of water. After completion of addition, heating and refluxing continues for 2 hours. At room temperature, the pH is adjusted 50 3.0+0.2. The molecular weight of the resultant copolymer is 5520.

At ambient temperatures, a suitable reaction vessel is charged with 20.05 parts of the above copolymer backbone, 5.96 parts of 40% glyoxal and 12.92 parts of water. The pH is adjusted to and maintained at 8.0 with 10% sodium hydroxide. The viscosity is monitored using a Gardner-Holt Bubble viscometer. When a viscosity of "C" is achieved, the reaction is quenched by judicious addition of 10% HCl to a pH of 3.5 (Polymer L).

EXAMPLE 19

A suitable three-necked reaction vessel equipped with a Ciaisen adaptor, reflux condensor, thermometer, mechanical stirrer and argon sparger is charged with 192.7 parts of 49% acrylamide, 243.8 parts of deionized water and 39.47 parts of 59.8% diallyldimethyl ammonium chloride. The pH is adjusted to 4.0+0.2 with 10% $H_2SO_4$. The stirring solution is then sparged with argon. After 50 minutes, 10.6 parts of hydroxyethyl-3-mercaptopropionate are added. Ammonium persulfate (2.36 parts) in 17.71 parts of deionized, sparged water is charged to the vessel at the end of ten minutes. Within eight minutes an exotherm peaks at 70° C. Temperature is maintained at 72° C. for the remainder of the reaction by means of a heating bath. One hour after initial catalyst addition, a booster catalyst of 2.36 parts of ammonium persulfate in 17.72 parts of sparged, deionized water is added over a one-hour period. The reaction mixture is then cooled and used in the next step. The copolymer's molecular weight is 1700.

A suitable reaction vessel is charged with 25.02 parts of the above copolymer backbone, 4.37 parts of 40% glyoxal and 0.14 part of deionized water. The pH is adjusted to 8.0 with 10% NaOH while stirring. Viscosity is monitored with a Gardner-Holt Bubble Viscometer. When a viscosity of C is achieved, the reaction is quenched with 10% $H_2SO_4$ to pH 3.3+0.2 (Polymer M).

EXAMPLE 20

The diallyldimethylammonium chloride of Examples C and D is replaced by an equivalent amount of methylvinyl pyridine (Polymer N).

EXAMPLE 21

The procedure of Examples C and D are again followed except that 2%, by weight, of the acrylamide is replaced by acrylic acid, all else remaining equal (Polymer O).

EXAMPLES 22–26

Polymer B is blended individually with each of 22) Polymer K, 23) Polymer L, 24) Polymer M, 25) Polymer N and 26) Polymer O (each replacing Polymer D) as per Example 8. Paper sheets made from each of the resultant polymer blends exhibit % Decay results similar to those shown in Table III for the polymer blend of Example 8.

EXAMPLES 27–32

Polymer D is blended individually with each of 27) Polymer E, 28) Polymer F, 29) Polymer G, 30) Polymer H, 31 ) Polymer I and 32) Polymer J (each replacing Polymer B) as per Example 8. When paper sheets are made from each of the resultant polymer blends, 3% Decay results similar to those exhibited in Table III for the polymer blend of Example 8 are achieved.

We claim:

1. A composition comprising a blend of:
   A) from about 5% to about 50%, by weight, of an ionic, water-soluble vinylamide polymer having a weight average molecular weight of from about 100,000 to about 3 million and sufficient glyoxal-reactive amide substituents and —CHOHCHO substituents to be thermosetting, the ratio of the number of said —CHOHCHO substituents to the number of said glyoxal-reactive substituents being in excess of about 0.02:1.0, respectively, and
   B) from about 50% to about 95%, by weight, of a glyoxalated, cationic, water-soluble vinylamide polymer containing from about 70–99%, by weight, of a vinylamide and having a weight average molecular weight ranging from about 500 to about 6000 before glyoxalation and sufficient glyoxal-reactive amide substituents and —CHOHCHO substituents to be thermosetting, the ratio of glyoxal substituents to vinylamide substituents in excess of about 0.1:1.0, respectively.

2. A composition according to claim 1 wherein component A is a copolymer of acrylamide and diallyldimethylammonium chloride at a molar ratio of about 99:1 to about 75:25, respectively.

3. A composition according to claim 1 wherein component B is a copolymer of acrylamide and diallyldimethylammonium chloride.

4. A composition according to claim 1 wherein component B is a terpolymer of acrylamide, diallyldimethylammonium chloride and methacrylamidotrimethylammonium chloride.

5. A composition according to claim 1 wherein component B has a molecular weight ranging from about 1000 to about 4000.

6. A process of making temporary wet strength paper which comprises absorbing an effective amount of the composition of claim 1 on cellulose papermaking fibers in aqueous suspension, forming said suspension into a water-laid web and drying said web.

7. A process of claim 6 wherein component A is a copolymer of acrylamide and diallyldimethylammonium chloride at a molar ratio of about 99:1 to about 75:25, respectively.

8. A process according to claim 6 wherein polymer B is a copolymer of acrylamide and diallyldimethylammonium chloride.

9. A process of claim 6 wherein both components A and B are copolymers of acrylamide and diallyldimethylammonium chloride.

10. Temporary wet strength paper or paperboard composed of water-laid, cellulosic papermaking fibers bonded together by an adsorbed and at least partially cellulose-reacted content of the composition of claim 1.

11. Paperboard according to claim 10.

12. A composition according to claim 1 wherein the range of component A is from about 15–25% by weight, and the range of Component B is from about 75–85%, by weight.

13. The process of claim 7 wherein the range of component A is from about 15–25%, by weight, and the range of component B is from about 75–85%, by weight.

14. A composition according to claim 1 wherein said component A is prepared from a vinylamide polymer having a molecular weight of about 5,000 to about 25,000.

* * * * *